(12) United States Patent
Dharmadhikari

(10) Patent No.: US 7,330,887 B1
(45) Date of Patent: Feb. 12, 2008

(54) METHOD AND SYSTEM FOR TESTING WEB-BASED APPLICATIONS

(75) Inventor: Ashish D. Dharmadhikari, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 739 days.

(21) Appl. No.: 10/337,739

(22) Filed: Jan. 6, 2003

(51) Int. Cl.
*G06F 15/173* (2006.01)

(52) U.S. Cl. .................. 709/224; 709/233

(58) Field of Classification Search ........ 709/202, 709/203, 222, 224, 226, 228, 229, 233; 715/236
See application file for complete search history.

(56) References Cited

U.S. PATENT DOCUMENTS

| | | | |
|---|---|---|---|
| 6,006,260 | A | 12/1999 | Barrick, Jr. et al. |
| 6,269,370 | B1* | 7/2001 | Kirsch ............... 709/219 |
| 6,314,463 | B1 | 11/2001 | Abbott et al. |
| 6,421,070 | B1* | 7/2002 | Ramos et al. ......... 715/763 |
| 6,529,939 | B1* | 3/2003 | Kraft .................. 709/203 |
| 6,625,647 | B1 | 9/2003 | Barrick, Jr. et al. |
| 2002/0099818 | A1 | 7/2002 | Russell et al. |
| 2002/0116491 | A1 | 8/2002 | Boyd et al. |
| 2002/0129164 | A1* | 9/2002 | Van Der Meulen et al. 709/239 |
| 2003/0005044 | A1* | 1/2003 | Miller et al. ............ 709/203 |
| 2004/0103193 | A1* | 5/2004 | Pandya et al. ........... 709/224 |
| 2005/0108238 | A1* | 5/2005 | Rahman ................. 707/9 |

OTHER PUBLICATIONS

Symantec i³™ for J2EE, Datasheet: Application Performance Management, Performance management for the J2EE platform, http://eval.veritas.com/mktginfo/products/Datasheets/Application_performance/1051765_8_i3J2EE_ds.pdf, pp. 1-4.
Symantec i³™ for J2EE, Datasheet: Application Performance Management, Performance management for the J2EE platform, http://eval.veritas.com/mktginfo/products/Datasheets/Application_Performance/1051765_8_i3J2EE_ds.pdf, pp. 1-4, Feb. 2006.

* cited by examiner

*Primary Examiner*—Phuoc Nguyen
(74) *Attorney, Agent, or Firm*—Hickman Palermo Truong & Becker LLP (57) ABSTRACT

A method and system is disclosed for testing web-based applications. In one embodiment, the response time of one or more web pages is measured. The loading of a web page is initiated. A first event is received indicating preparation to navigate to the web page. A timer mechanism is started. A second event is received indicating that the web page has completed loading. The timer mechanism is stopped. The elapsed time for the web page to load is determined. In an alternative embodiment, a system for integrated testing of web-based applications is described. Multiple testing functions included in the integrated testing system include performance time measurement, URL recording and replay and HTML link validation.

26 Claims, 5 Drawing Sheets

METHOD AND SYSTEM FOR TESTING WEB-BASED APPLICATIONS

FIELD OF THE INVENTION

The present invention generally relates to software testing tools. The invention relates more specifically to a method and system for testing web-based applications.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In recent years, the Internet has experienced explosive growth. Many business functions are now performed using client-server applications that are based on World Wide Web technologies. Professional development of web-based software applications normally includes a test phase to determine whether new or modified applications contain errors. Typically, the web-based application includes a server component that is executed at a computer server and that generates HTML documents. The HTML documents are sent over a network to a client computer that receives and renders the HTML documents using a browser.

A browser is a computer program specifically designed to help users view and navigate hypertext, on-line documentation or a database. The term "browser" most often refers to a computer program designed to permit a user to view and interact with hypertext information, such as pages and programs written in Hypertext Markup Language (HTML) that are communicated using the Hypertext Transfer Protocol (HTTP). Examples of commonly used web browser programs are Microsoft Internet Explorer®, commercially available from Microsoft, Inc. of Redmond, Wash. and Netscape Navigator®, commercially available from Netscape Communications, Inc. of Mountain View, Calif.

When testing the web-based application, using one current approach, a test engineer is required to use multiple tools for different testing functions, in conjunction with a separate web browser. This approach is cumbersome because the test engineer is required to switch between different software tools and the browser. It is difficult to integrate or correlate the results.

The testing tools needed to test web-based applications differ according to the scope of the testing involved. For example, tools used to test the functionality of the application are most likely to be different from the tools used to measure the performance of the application. In this context, performance typically refers to the time required for the server component to generate an HTML document in response to receiving a particular request from the client.

Functionality can be tested using tools that record and replay Universal Resource Locators (URLs) that identify the HTML documents. For example, testing tools used to perform Universal Resource Locator (URL) record and relay include Solex, available at (http://solex.sourceforge.net) and Max Q, available at (http://www.bitmechanic.com/projects/maxq/). Tools used to test automatic link validation include Web Link Validator, commercially available from REL Software, and Astra Site Manager, commercially available from Mercury Interactive, Inc. of Sunnyvale, Calif.

Furthermore, tools used for measuring certain attributes of performance of a web application, in terms of the time required for a server to generate and provide an HTML page and for a browser to download and render the web page, are either absent or inaccurate and inefficient. For example, in a prior approach, test engineers use stopwatches to measure web page performance time because there is currently no known performance measurement tool. The stopwatch approach is inaccurate and inefficient.

Based on the foregoing, there is a clear need for a method for testing web-based applications that provides a single interface that would be applicable for multiple test activities.

Further, there is a need for a method of testing web-based applications that provides performance time measurement and functional testing.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and system for testing web-based applications is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
   3.0 Measuring Web Page Performance Time
   4.0 Integrated Testing System
   5.0 Hardware Overview
   6.0 Extensions and Alternatives

1.0 GENERAL OVERVIEW

The needs identified in the foregoing Background, and other needs and objects that will become apparent for the following description, are achieved in the present invention, which comprises, in one aspect, a method and system for testing web-based applications. In one embodiment, the response time of one or more web pages is measured. The loading of a web page is initiated. A first event is received indicating preparation to navigate to the web page. A timer mechanism is started. A second event is received indicating that the web page has completed loading, which includes downloading and rendering of the web page. The timer mechanism is stopped. The elapsed time for the web page to load is determined.

In an alternative embodiment, a system for integrated testing of web-based applications is described. Multiple testing functions included in the integrated testing system include performance time measurement, URL recording and replay and HTML link validation.

In other aspects, the invention encompasses a computer apparatus and a computer-readable medium configured to carry out the foregoing steps.

2.0 STRUCTURAL AND FUNCTIONAL OVERVIEW

Figure 1:
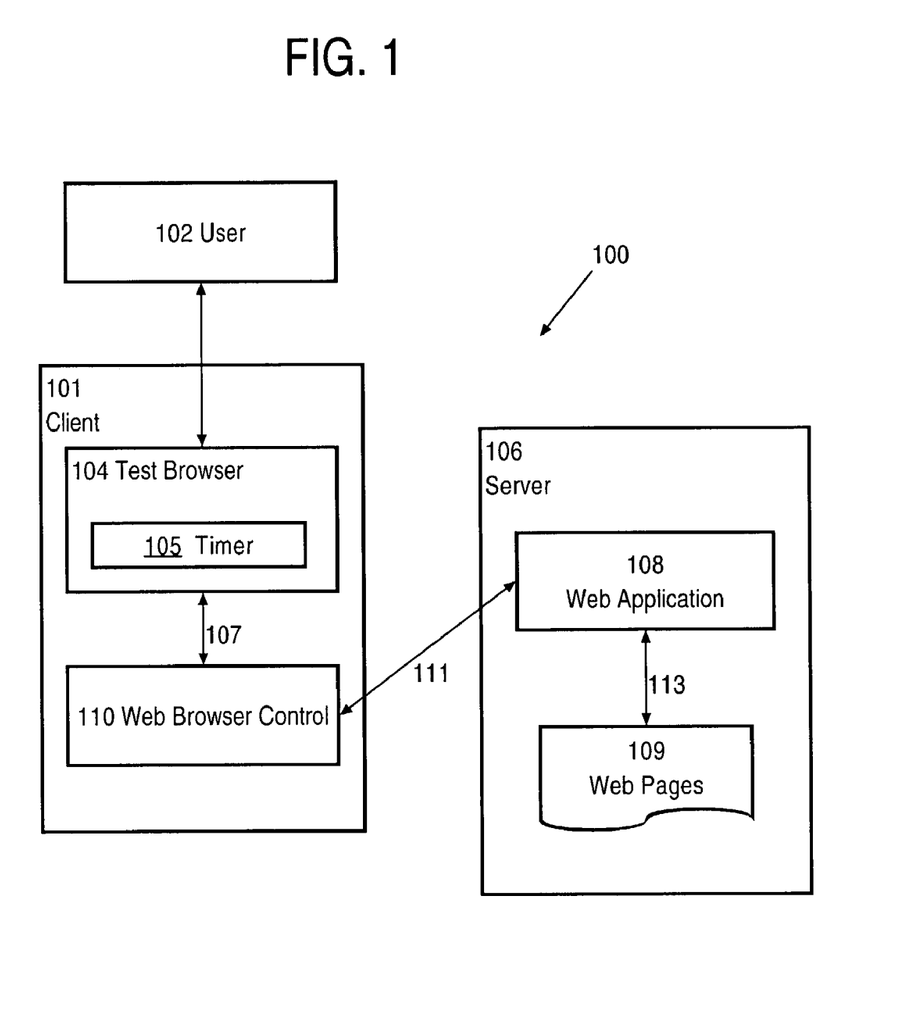
FIG. 1 is a block diagram that illustrates an arrangement upon which an embodiment of the present method may be implemented.

FIG. 1 is a block diagram illustrating an arrangement 100 upon which an embodiment of the present method may be implemented. The arrangement 100 includes a client 101, user 102, test browser 104, timer mechanism 105, server 106, web application 108, web pages 109 and a web browser control 110. User 102 is associated with client 101. Web browser control 110 is communicatively coupled to web application 108 by a communication link 111. Communications link 111 may be implemented by any medium or mechanism that provides for the exchange of data between network elements. Examples of communications link 111 include, without limitation, a network such as a Local Area Network (LAN), Wide Area Network (WAN), Ethernet or the Internet, or one or more terrestrial, satellite or wireless links. Communications link 111 may be secure, depending upon the requirements of a particular application.

Test browser 104 is programmatically coupled by link 107 to web browser control 110. Using link 107, test browser 104 can receive and respond to events that are generated by web browser control 110. Link 107 may be implemented using any suitable programming technique and may represent a function call, DLL call, etc. Timer mechanism 105 is any software or hardware mechanism for measuring a period and recording or generating an elapsed time value. In one embodiment, timer mechanism 105 is implemented as a software timer.

In this configuration, client 101 communicates with server 106 for purposes of testing web application 108. Client 101 executes test browser 104. Server 106 executes web application 108, which hosts/generates web pages 109, as indicated by link 113. Web application 108 is any application program that generates web pages 109 as part of its operation. Examples of application programs that could be tested include Resource Manager Essentials (RME) and Cisco-Works, commercially available from Cisco Technology, Inc. of San Jose, Calif.

In this description, the terms "document," "HTML document," and "web page" have the same meaning, and refer to any electronic document or HTML code that is generated or provided by web application 108.

In one embodiment, test browser 104 may establish a connection to web application 108. For example, test browser 104 opens an HTTP connection to an HTTP server running on server 106, or an HTTP daemon of web application 108. User 102 issues a request that specifies one or more web pages 109 using a document identifier, such as a URL. For example, user 102 may type "http://rme.cisco.com" in the URL entry line of test browser 104. Server 106 receives the request, parses it, retrieves the specified web page from among stored web pages 109, and sends a copy of the page in response to test browser 104. Test browser 104 receives a copy of the web page, parses coded instructions within the web page and displays the contents of the web page at client 101 accorded to coded instructions contained in the web page.

Further, as described hereafter, test browser 104 uses various test features contained therein and timer mechanism 105 to track responses while navigating to web pages and from web pages retrieved from server 106, such as performance time measurement, URL recording and replay, and link validation. For example, with respect to URL recording and replay, the recording activity occurs when navigating to a particular link begins. These recorded URL's can be stored, and later while replaying, the stored URL's may be used to navigate through the same set of web pages.

Figure 2:
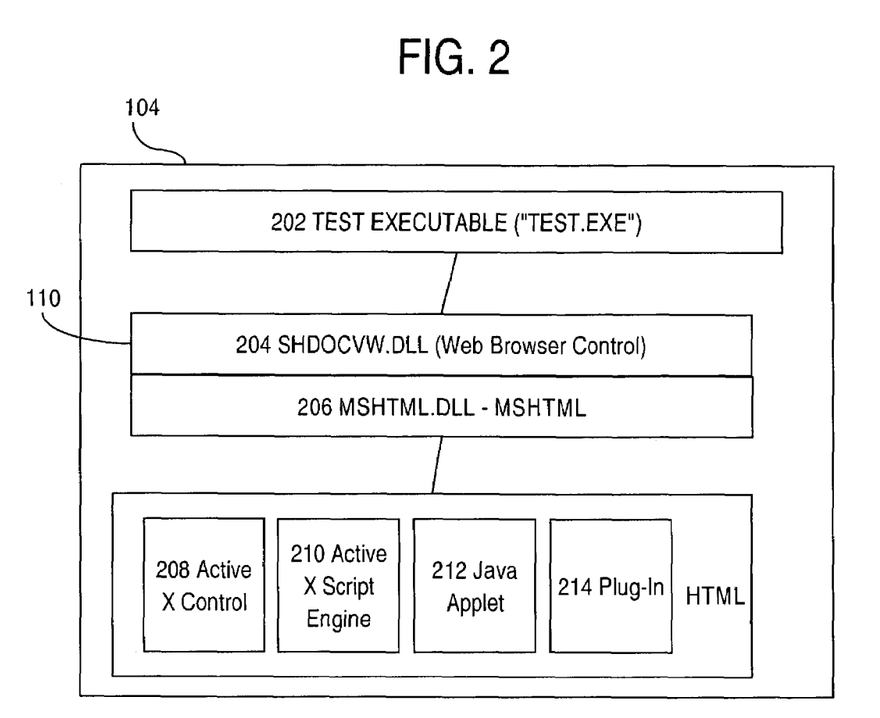
FIG. 2 is a block diagram that illustrates an exemplary test browser.

FIG. 2 is a block diagram illustrating the architecture of an example test browser. In this example, the test browser is shown in the context of Microsoft Internet Explorer; however, embodiments of a test browser are not limited to that context.

In one embodiment, a test executable 202 is logically structured at a top level. The test executable is a small application program that is invoked by a user or another application. In one embodiment, the test executable is named "test.exe." Test executable 202 uses Internet Explorer components to perform application page navigation, page history maintenance, HTML parsing and rendering. Test executable 202 generates a toolbar and frame for test browser 104.

Test executable 202 directly hosts a web browser control. In one embodiment, the web browser control is implemented as the dynamic link library (DLL) named "Shdocvw.DLL" of Internet Explorer, as indicated by SHDOCVW.DLL 204. The DLL 204 is dynamically linked with each application program that uses the web browser control. SHDOCVW.DLL 204 hosts the Microsoft HTML DLL component, as indicated by MSHTML.DLL 206. DLL 204 also may host any other Microsoft Active Document component (such as a Microsoft office application) that can be loaded in test browser 104 when user 102 navigates to a specific web page.

MSHTML.DLL 206 performs that HTML parsing and rendering within test browser 104. MSHTML.DLL also exposes web pages to other program elements through the dynamic HTML Object Model defined by Microsoft. MSH-TML.DLL 206 hosts one or more of an ActiveX scripting engine 210, ActiveX Control 208, Java applets 212, plug-ins 214 and other objects that might be referenced in the loaded HTML document. MSHTML.DLL 206 also implements Active Document server interfaces, which allows it to be hosted using standard Component Object Model (COM) interfaces. Further information about the structure of Microsoft Internet Explorer and its web browser control is available from Microsoft at the document "browser_control_ovw_entry.asp," available at the time of this writing by loading the page "/library/default.asp?url=/workshop/browser/webbrowser/browser_control_ovw_entry.asp" from the "msdn.microsoft.com" domain of the World Wide Web.

In one embodiment, using this arrangement test executable 202 measures web page performance time, and performs other test functions, by making calls to web browser control 110 and performing functions that are triggered by events generated by web browser control 110. For example, user 102 issues a request that specifies a web page using a URL, and web application 108 is contacted. In response, web browser control 110 automatically generates an event indicating that the web browser control is beginning to navigate to the URL that was entered, and a subroutine in the test browser code is triggered by receiving that event.

For example, when web browser control 110 is preparing to navigate to a new location, the web browser control triggers a "BeforeNavigate2" event that contains the URL or path of the new location and any other data that will be transmitted to server 106. Web browser control 110 generates a "DocumentComplete" event occurs a navigation operation finishes, is halted or fails. By receiving and acting on events generated by browser control 110, test browser 104 can perform test functions, as described further below.

In another embodiment, a window or area in a user interface generated by test browser 104 reports testing results.

Figure 3:
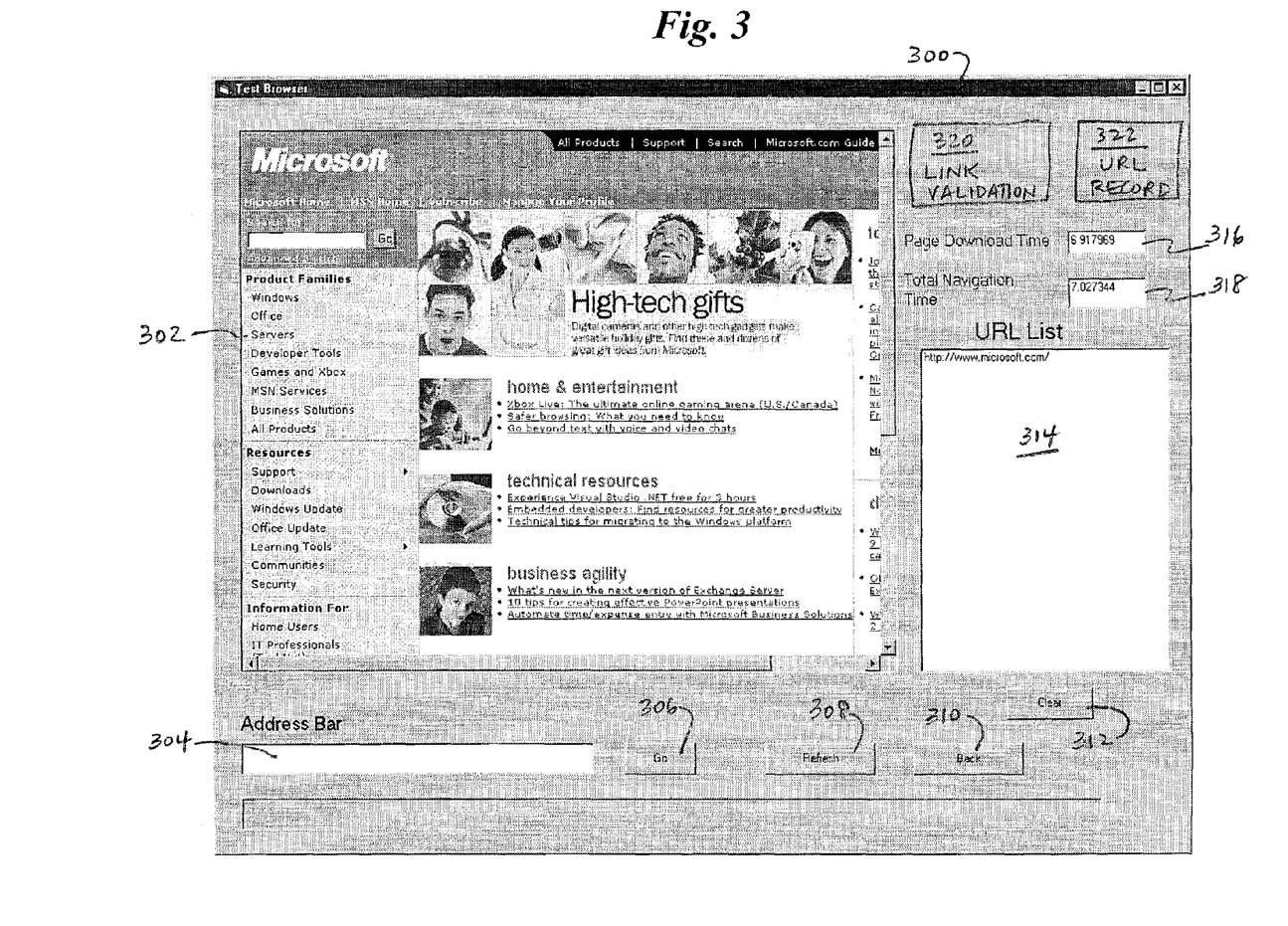
FIG. 3 is a sample graphical user interface (GUI) generated by an exemplary test browser.

FIG. 3 is an illustration of a sample graphical user interface (GUI) 300 generated by test browser 104. A page display pane 302 displays a web page generated by an application under test. In the example of FIG. 3, page display pane 302 displays a home page of Microsoft Corporation rather than a page generated by an application under test. An address bar 304 receives user input for URLs of application pages for display.

The GUI 300 also includes a Go button 306, Refresh button 308, and Back button 310 (collectively, "navigation buttons"). Selecting the Go button causes test browser 104 to load a page represented by a URL entered in Address Bar 304, render the page, and display the page in page display pane 302. Selecting the Refresh button 308 causes test browser 104 to reload, re-render, and re-display the same page that is displayed in pane 302. Selecting the Back button 310 causes test browser 104 to select, reload, re-render, and re-display an immediately previous page.

GUI 300 includes a URL list 314 that displays a history of URLs that have been loaded and displayed in pane 302. Selecting a Clear button 312 removes all items from the URL list 314 and clears it. GUI 300 further may include buttons for selecting test functions, including a HTML link validation button 320 and URL recording and replay button 322. Selecting any of buttons 320, 322 causes test browser 104 to invoke a corresponding test function and to generate pertinent test data.

An additional section of the GUI 300 displays the test results for a particular testing function. For example, in FIG. 3, the performance time values for web application 108 are displayed in Page Download Time field 316 and Total Navigation Time field 318. Page Download Time field 316 shows the time required to obtain the web page from server 106, and Total Navigation Time field 318 shows the sum of the Page Download Time and time required for rendering the web page.

Using GUI 300, a test engineer or other user can access numerous different test functions from test browser 104. Further, the user can interact with web application 108 in the same manner as any user of the application, and can select one or more test functions at any time during the interaction. As a result, multiple test functions can be executed and results can be compared and correlated without using different individual tools. The techniques herein provide the test engineer with a single multipurpose tool for testing of web-based applications.

Further, the approaches herein provide an accurate and efficient means of measuring performance timing. Use of an automatic software timer, which is precisely triggered by events generated from the web browser control as pages are requested and loaded, results in precision automatic timing far superior to the prior stopwatch approach. In embodiments that use the web browser control of Microsoft Internet Explorer, the resulting performance time values are identical to the performance time experienced by a user who is using the conventional Internet Explorer browser. Thus, a true measurement of user experience can be generated.

3.0 MEASURING WEB PAGE PERFORMANCE TIME

Figure 4:
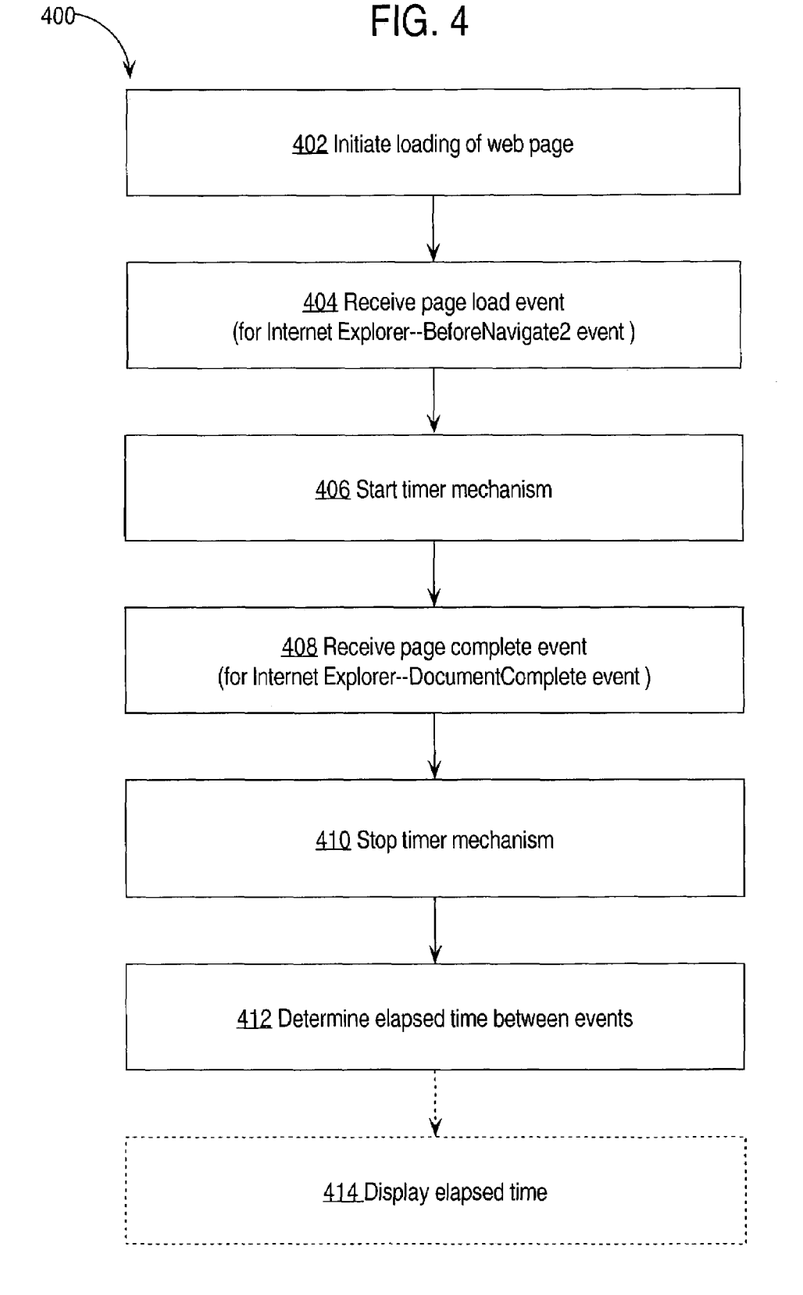
FIG. 4 is a flow diagram that illustrates a method for measuring the response time of web-based application pages.

FIG. 4 is a flow diagram that illustrates one embodiment of a method for testing a web-based application. For purposes of illustrating a clear example, the method of FIG. 4 is described herein with reference to arrangement 100 and architecture of exemplary test browser 200 of FIG. 1 and FIG. 2. However, the method of FIG. 3 is not limited to these contexts.

In one embodiment, the time to navigate from one web page to another, using application 108, is measured by receiving events that are generated by web browser control 110 before starting navigation to a link and after completing downloading a web page. By operating a timer mechanism between these events, the time required for navigating from one page to another can be calculated.

For example, in block 402, the loading of a web page is initiated. Block 402 may be performed by test browser 104 in response to receiving a URL entered by user 102. Alternatively, block 402 may be performed when application 108 instructs test browser 104 to load a web page as part of performing a particular function.

In block 404, a "BeforeNavigate2" event is received by test browser 104 from web browser control 110. The "BeforeNavigate2" event is generated automatically by web browser control 110 when test browser 104 starts to navigate to a particular web page. In block 406, a timer mechanism is started. For example, in response to receiving the "BeforeNavigate2" event, test browser 104 starts timer mechanism 105. As part of block 406, first data representing the then-current time may be stored in memory.

In block 408, a "DocumentComplete" event is received by test browser 104 from web browser control 110. The "DocumentComplete" event is generated automatically by web browser control 110 when the web page has been completely loaded and initialized.

In block 410, the timer mechanism is stopped. For example, test browser 104 stops timer mechanism 105 in response to receiving the "DocumentComplete" event from web browser control 110. The timer mechanism 105 records second data representing the then-current time; in comparison with the first data, the second data enables determining the timing of the firing of the events.

In block 412, the difference in the times of the events is determined, which represents a performance time value, or the time taken for the document to load. Block 412 may involve subtracting the first data from the second data to yield a time difference value. Thus, the performance time value for a web page is the total time required for the following set of activities to occur: 1) sending of a URL to server 106, 2) receiving a web page from server 106, and 3) rendering or displaying a web page.

Optionally, in block 414, the calculated elapsed time is displayed. For example, the performance time value may be displayed as depicted in FIG. 3. Alternatively, the performance time value may be sent to another application or program using any suitable programmatic mechanism, such as a function call, remote procedure call, event publishing, etc.

4.0 INTEGRATED TESTING SYSTEM

In additional embodiments, other events and application programming interfaces (APIs) associated with web browser control 110 may be used to enable test browser 104 to perform other testing functions, such as URL capture and playback, link validation, and analysis and reporting.

In one embodiment, URL recording and replay involves recording an activity manually and replaying it automatically at a later point in time. The web browser control 110 receives and stores information representing each HTTP request that is generated by test browser 104. The sequence of URL calls is saved. Later, a user can retrieve the sequence of URL calls and request test browser 104 to replay the calls. In response, test browser 104 invokes each URL call, alone or in cooperation with web browser control 110.

In one embodiment, the event used for recording is "BeforeNavigate2", which provides complete information about the URL call that is about to be made. When test browser 104 receives a "BeforeNavigate2" event from web browser control 110, the test browser extracts the URL call and other pertinent data from the event message and stores the call and data in a URL list structure.

The URL call along with the associated data can be stored for replaying later. To replay a URL, the test browser calls the "Navigate" function provided by the WebBrowser Control with the URL as parameter. This can be repeated for each URL in the recorded set of URL's. Thus a complete test scenario can be replayed.

In one embodiment, HTML link validation involves inspecting links in one or more web pages to identify invalid or "broken" links. Functions of the API provided by web browser control 110 are invoked to perform automatic traversal through a set of web pages to determine whether broken links exist. This testing function requires an additional technique which recursively validates the links present in a web page that is loaded.

In another embodiment, test analysis and reporting provides test case reports and performance analysis. This testing does not use any API's or events of the web browser control 110. Such testing is performed using a separate code routine included in test browser 104 that analyzes and reports collected data. For example, a test case comprising one or more URL calls required for particular functionality is created and stored. Using a file open dialog, an individual test case is retrieved from storage. In one embodiment, the URLs that form the test case are displayed in URL list 314. Selecting the Go button 306 causes test browser 104 to replay each of the URLs in the URL list 314 using the URL record/reply function of the test browser 104. Time values are determined and stored for each URL call, based on the performance of the application 108 in generating each associated web page. A time value is also determined and stored for the test case as a whole. In this manner, accurate timings can be determined for discrete functions that consist of multiple URL calls.

In one embodiment, a set of web pages is navigated through using test browser 104 with a recording mode on. All the URL's are stored for a particular test case. The entire set of URL's may be replayed at a later time. The performance data for multiple replay sessions may be stored, Therefore, when conducting a performance analysis, all the performance data for multiple sessions may be shown, In addition, the improvement or degradation of performance across multiple sessions may be indicated, and the total time required for the operation (or the test case) may be shown.

Based on a predetermined cut-off value for response time, the URL's which are performance bottlenecks may also be indicated.

5.0 HARDWARE OVERVIEW

Figure 5:
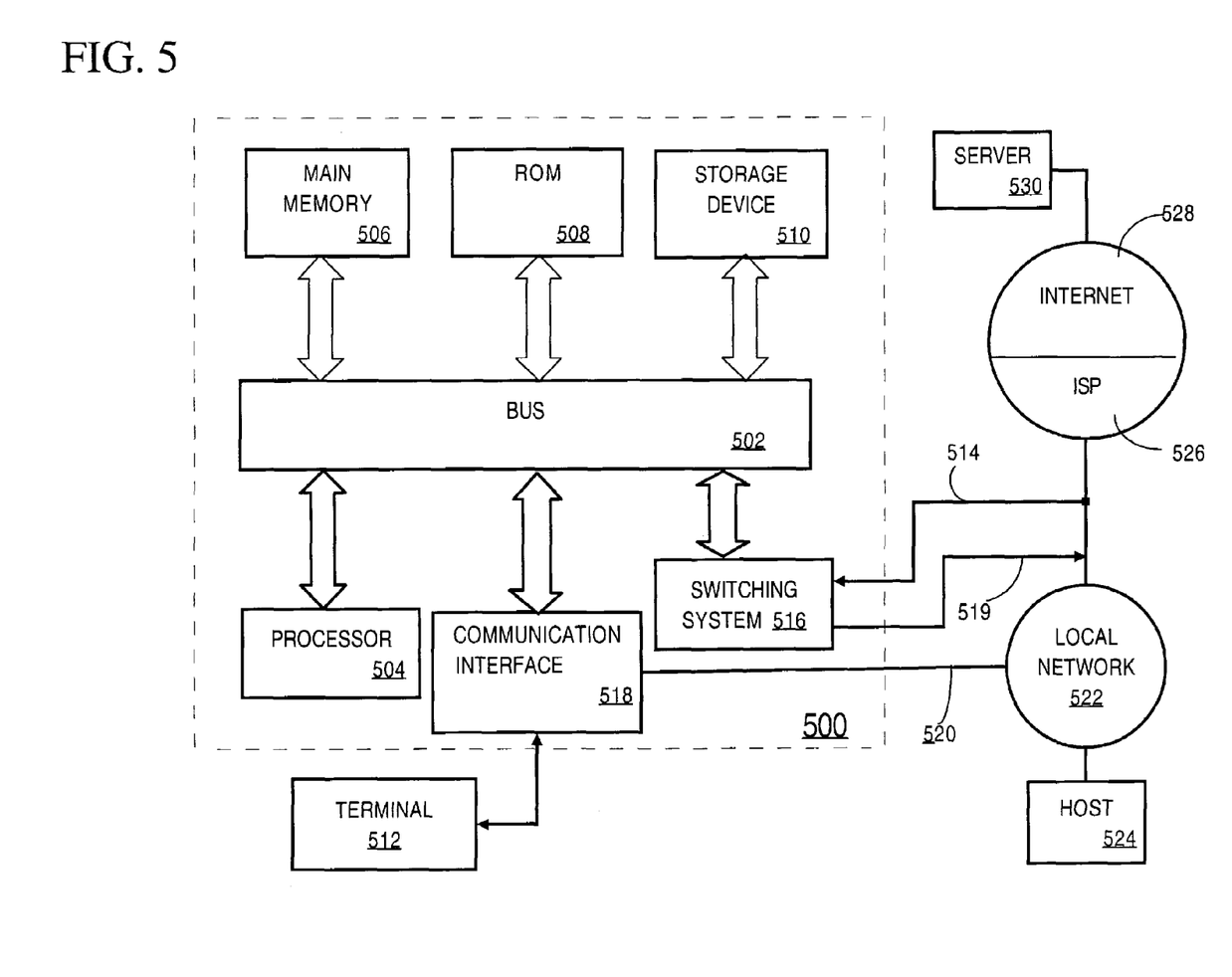
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for testing a web-based application. According to one embodiment of the invention, testing for a web-based application is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 550 might transmit a requested code for an application program through Internet 528, ISP 526, local network 522 and communication interface 518. In accordance with the invention, one such downloaded application provides for testing web-based applications as described herein.

The received code may be executed by processor 504 as it is received, and/or stored in storage device 510, or other non-volatile storage for later execution. In this manner, computer system 500 may obtain application code in the form of a carrier wave.

6.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of measuring response times of applications that generate one or more web pages, the method comprising the computer-implemented steps of:
   receiving a user selection of a test function through a user interface object on a test browser, wherein said user selection of said test function identifies a web page, and wherein said test function includes testing a response time of an application that generates said web page;
   initiating loading of said web page;
   in response to receiving a first event, starting a timer;
   in response to receiving a second event, stopping said timer,
   wherein said second event indicates said web page has completed loading;
   determining an elapsed time for said web page to load;
   rendering said web page in a display panel of the test browser; and
   reporting said elapsed time on a user interface, separate from said display panel, generated by the test browser.

2. The method as recited in claim 1, wherein said first event indicates preparation to navigate to said web page.

3. The method as recited in claim 1, wherein said second event indicates said web page has completed loading.

4. The method as recited in claim 1, wherein said first and second events are generated by a web browser control.

5. The method as recited in claim 1, wherein said event indicating preparation to navigate to said web page is a BeforeNavigate2 event that is generated by a web browser control of Microsoft Internet Explorer.

6. The method as recited in claim 1, wherein said second event indicating that said web page has completed loading is a DocumentComplete event that is generated by a web browser control of Microsoft Internet Explorer.

7. The method as recited in claim 1, wherein the steps of receiving, starting, stopping and determining are performed using a browser executable that is programmatically coupled to the web page control.

8. The method as recited in claim 1, wherein the first event and second event are generated by a web page control that forms part of a dynamic linked library of a web browser.

9. The method as recited in claim 1, wherein the step of determining the elapsed time comprises determining a time required to download said web page from the application.

10. The method as recited in claim 1, wherein the step of determining the elapsed time comprises determining a time required to download said web page from the application and render said web page in the application.

11. A computer-readable storage medium carrying one or more sequences of instructions for measuring response times of applications that generate one or more web pages, which instructions, when executed by one or more processors, cause the one or more processors to carry out the steps of:
   receiving a user selection of a test function through a user interface object on a test browser, wherein said user selection of said test function identifies a web page, and wherein said test function includes testing a response time of an application that generates said web page;

initiating loading of said web page;
in response to receiving a first event, starting a timer;
in response to receiving a second event, stopping said timer;
wherein said second event indicates said web page has completed loading;
determining an elapsed time for said web page to load;
rendering said web page in a display panel of the test browser; and
reporting said elapsed time on a user interface, separate from said display panel, generated by the test browser.

12. A computer program product for measuring response times of applications that generate one or more web pages, comprising:
a test executable;
a "SHDOCVW.DLL" web browser control that is communicatively coupled to the test executable;
wherein the test executable comprises one or more sequences of instructions which, when execute:
receiving a user selection of a test function through a user interface object on a test browser, wherein said user selection of said test function identifies a web page, and wherein said test function includes testing a response time of an application that generates said web page;
initiating loading of said web page;
in response to receiving a first event, starting a timer;
in response to receiving a second event, stopping said timer;
wherein said second event indicates said web page has completed loading;
determining an elapsed time for said web page to load;
rendering said web page in a display panel of the test browser; and
reporting said elapsed time on a user interface, separate from said display panel, generated by the test browser.

13. The computer program product as recited in claim 12 wherein said first event indicates preparation to navigate to said web page.

14. The computer program product as recited in claim 13, wherein said second event indicates said web page has completed loading.

15. The computer program product as recited in claim 13, wherein said first and second events are generated by a web browser control.

16. The computer program product as recited in claim 13, wherein the first event and second event are generated by a web page control that forms part of a dynamic linked library of a web browser.

17. The computer program product as recited in claim 13, wherein the one or more stored sequences of instructions which, when executed by the processor, cause the processor to carry out determining the elapsed time comprises instructions for determining a time required to download said web page from the application.

18. The computer program product as recited in claim 13, wherein the one or more stored sequences of instructions which, when executed by the processor, cause the processor to carry out determining the elapsed time comprises instructions for determining a time required to download said web page from the application and render said web page in the application.

19. An apparatus for measuring response times of applications that generate one or more web pages, comprising:
means for receiving a user selection of a test function through a user interface object on a test browser, wherein said user selection of the test function identifies a web page, and wherein the test function includes testing response time of an application that generates said web page;
means for initiating loading of said web page;
means for in response to receiving a first event, starting a timer;
means for in response to receiving a second event, stopping said timer;
wherein said second event indicates said web page has completed loading;
means for determining an elapsed time for said web page to load;
means for rendering said web page in a display panel of the test browser; and
means for reporting said elapsed time on a user interface, separate from said display panel, generated by the test browser.

20. An apparatus for measuring response times of applications that generate one or more web pages, comprising:
a network interface that is coupled to the data network for receiving one or more packet flows therefrom;
a processor;
one or more stored sequences of instructions which, when executed by the processor, cause the processor to carry out the steps of:
receiving a user selection of a test function through a user interface object on a test browser, wherein said user selection of the test function identifies a web page, and wherein the test function includes testing response time of an application that generates said web page;
initiating loading of said web page;
in response to receiving a first event, starting a timer;
in response to receiving a second event, stopping said timer;
wherein said second event indicates said web page has completed loading;
determining an elapsed time for said web page to load;
rendering said web page in a display panel of the test browser; and
reporting said elapsed time on a user interface, separate from said display panel, generated by the test browser.

21. The apparatus as recited in claim 20, wherein said first event indicates preparation to navigate to said web page.

22. The apparatus as recited in claim 20, wherein said second event indicates said web page has completed loading.

23. The apparatus as recited in claim 20, wherein said first and second events are generated by a web browser control.

24. The apparatus as recited in claim 20, wherein the first event and second event are generated by a web page control that forms part of a dynamic linked library of a web browser.

25. The apparatus as recited in claim 20, wherein the one or more stored sequences of instructions which, when executed by the processor, cause the processor to carry out determining the elapsed time comprises instructions for determining a time required to download said web page from the application.

26. The apparatus as recited in claim 20, wherein the one or more stored sequences of instructions which, when executed by the processor, cause the processor to carry out determining the elapsed time comprises instructions for determining a time required to download said web page from the application and render said web page in the application.

* * * * *